Apr. 3, 1923. 1,450,814
H. R. MICKA
FUEL GAS MIXER
Filed Nov. 12, 1921  2 sheets-sheet 1
*Fig. 1.*
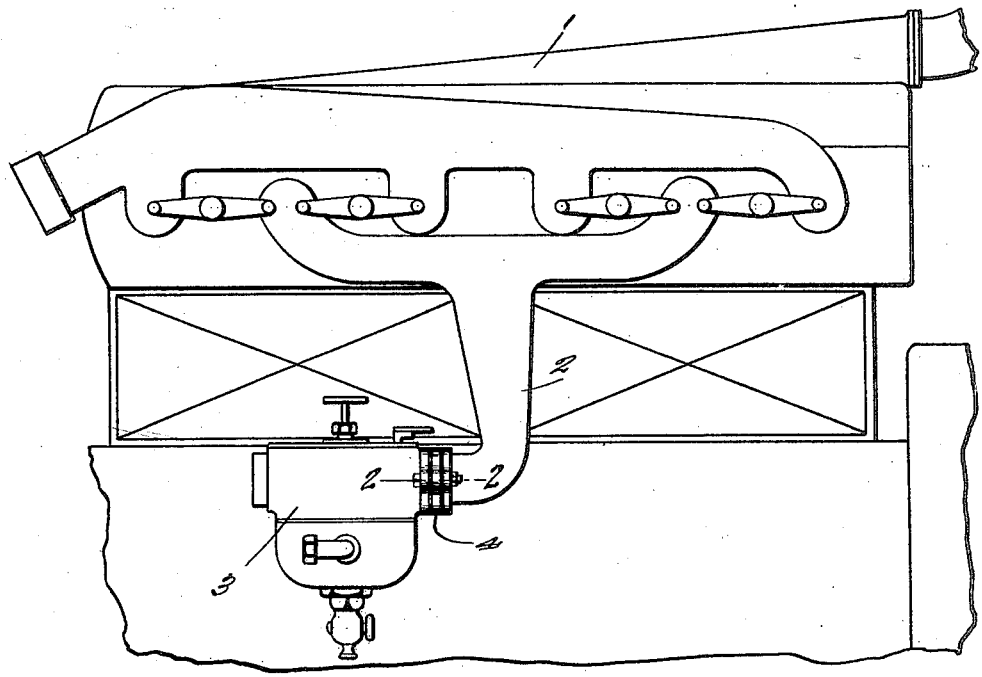
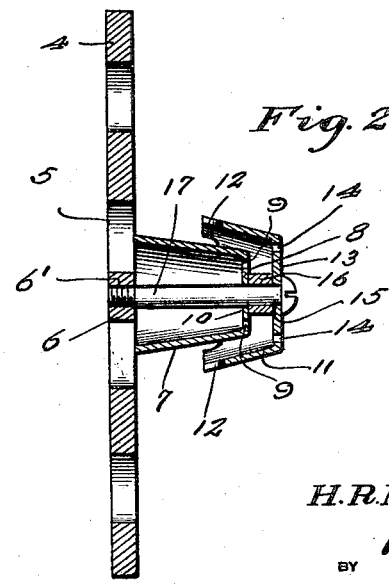
*Fig. 2*
H. R. Micka INVENTOR
BY Victor J. Evans ATTORNEY
WITNESSES

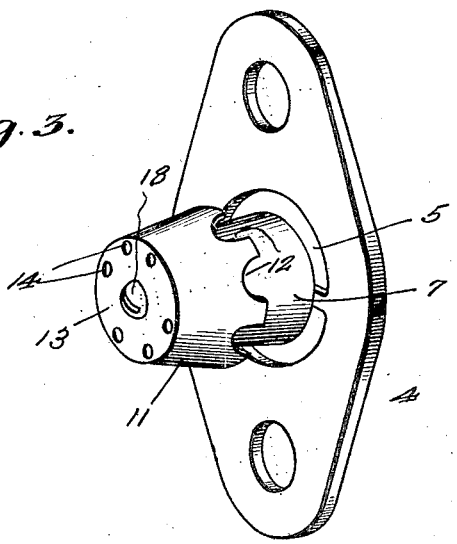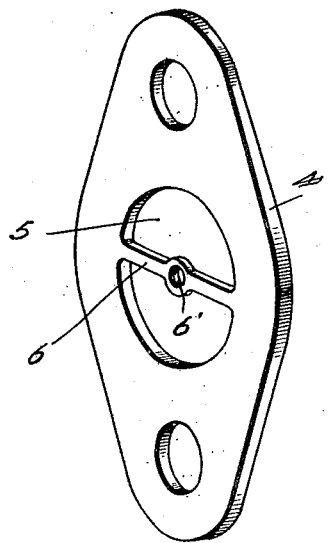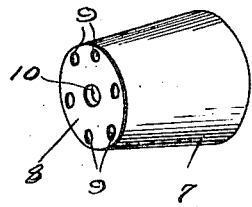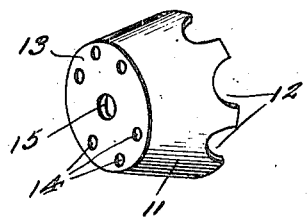

Patented Apr. 3, 1923.

1,450,814

UNITED STATES PATENT OFFICE.

HENRY R. MICKA, OF MAYWOOD, ILLINOIS.

FUEL-GAS MIXER.

Application filed November 12, 1921. Serial No. 514,654.

*To all whom it may concern:*

Be it known that I, HENRY ROMMEL MICKA, a citizen of the United States, residing at Maywood, in the county of Cook and State of Illinois, have invented new and useful Improvements in Fuel-Gas Mixers, of which the following is a specification.

My present invention has reference to internal combustion engines, and is directed to a means for breaking up the fuel into finer particles during its passage from the carbureter through the intake manifold proper to overcome the improper or imperfect mixing of the fuel and air, and consequently to produce a thorough and complete volatilization of the hydrocarbon and consequently greater power from the fuel.

It is a still further object to produce a carburation device for internal combustion engines which may be secured between the carbureter and intake manifold without altering or changing the parts of the engine, which shall be of a simple construction, automatic in actuation and thoroughly efficient for the purpose for which it is devised.

The foregoing, and other objects which will appear as the nature of the invention is better understood, may be accomplished by a construction, combination and operative association of parts, such as is disclosed by the drawings which accompany and which form part of this specification.

In the drawings:—

Figure 1 is a side elevation of a portion of an internal combustion engine illustrating the application of the improvement.

Figure 2 is a greatly enlarged sectional view approximately on the line 2—2 of Fig. 1.

Figure 3 is a perspective view of the improvement removed from the engine showing the parts thereof operably associated.

Figure 4 is a perspective view of the flanged plate.

Figure 5 is a similar view of the inner conical mixer.

Figure 6 is a similar view of the outer conical mixer.

According to standard practice, the combustible mixture for internal combustion engines is produced in a carbureter provided with a gas or gasoline inlet and an air inlet opening which are separably adjusted and an outlet provided with a butterfly valve or similar device for regulating the flow of the mixture into the intake manifold of the engine. All mixing of the charge is done in the carbureter although the vapor is not always heated to a proper temperature before entering the engine cylinders. From experience, I have found that the most effective, and in my opinion, the only reliable method of mechanically mixing the hydro-carbon and air is in or adjacent to the entrance to the intake manifold, and the mixer must be of a nature which will not impede the free flow of the vapor due to the suction of the engine and must also maintain a uniform density and composition throughout the entire advancing column.

Referring now to the drawings in detail, the numeral 1 designates a portion of an internal combustion engine, 2 the intake manifold thereof, and 3 the carbureter connected to the intake manifold, and between the carbureter and the intake pipe of the manifold my improvement is arranged.

The improvement includes a flange plate 4 of a size and shape corresponding to those of the flanges between the intake pipe of the manifold and the carbureter. Thus, the same bolts which connect these last mentioned flanges secure the plate 4 therebetween. Suitable gaskets may be arranged between the flange plate 4 and the carbureter and intake manifold flanges to insure an effective joint therebetween.

The flanged plate 4 is centrally provided with a rounded opening 5 and a bridge piece 6, which passes centrally through the said opening. The bridge piece has its central portion enlarged, rounded in plan and provided with an opening 6'. The opening 6' is threaded.

Designed to rest on one face of the plate 4, at the center thereof, and in contacting engagement with the bridge 6, but of a size not sufficient to entirely close the opening 5, is the inner conical mixer member 7. The member 7 has its outer reduced end closed, its widened end being open and its said closed end, 8, is provided, at its edges with equi-distantly spaced orifices 9. The closed end also has a central opening 10 therethrough which is arranged in alignment with the threaded opening 6' in the bridge piece 6 of the plate 4. The outer frusto-conical mixer is of a less length but greater diameter than the inner mixer 7, the inner and widened open end of the said mixer 11 being scalloped, as at 12 and its outer closed face 13 is provided, at its edge with spaced orifices 14. The closed end is also provided with a central opening 15.

In contacting engagement with the outer closed face 8 of the inner mixer 7 and the inner face at the closed end of the outer mixer 11 there is a spacer washer 16, and passing through the openings 15, through the washer, through the opening 10 and engaging in the threaded opening 6' there is a bolt member 17. The kerfed head 18 of the bolt is in contacting engagement with the outer closed face of the outer mixer 11.

Parts of the hydro-carbon and air from the carbureter will be first directed through the opening 5 and into the inner mixer 7, the other parts passing through the opening 5 over the outer surface of the inner mixer 7. These last mentioned parts will be received in the outer mixer 11, as will the first mentioned parts, the latter passing through the orifices 9 in the inner mixer. The first mentioned parts will be broken in their passage through the inner mixer, the last mentioned parts will be mixed with the first mentioned parts in the outer mixer 11, and certain of the mixed parts will then pass through the orifices 14 in the closed end of the outer mixer, while the other and major parts of the fuel will be redirected toward the inner mixer 7 and the plate 4, such fuel being further broken in its passage between the flared outer wall of the inner mixer 7 and the scalloped edge of the outer mixer. Thus the particles constituting the mixture will be thoroughly broken up to produce a thorough and complete volatilization of the hydro-carbon before the same enters the engine cylinders, and as a consequence more power will be obtained from the fuel.

It is thought that the foregoing description, when taken in connection with the drawings will fully set forth the construction, operation and advantages of the improvement, but it is to be understood that the description and showing refer only to a satisfactory embodiment of the invention as it now appears to me and therefore I may make such changes therefrom as fall within the scope of what I claim.

Having described the invention, I claim:—

1. An auxiliary fuel mixer for fuel conduits comprising a plate having a central opening which partly closes the passage of the conduit, an inner hollow frusto-conical member arranged over but not wholly closing the opening, said member having its outer reduced and closed end apertured, a second and outer hollow frusto-conical mixer arranged over but spaced away from the end of the first mentioned mixer, said last mentioned mixer having its outer reduced end apertured, and its inner edge scalloped.

2. In combination with an internal combustion engine, of an auxiliary fuel mixer including a plate secured between the carbureter and the intake manifold, said plate having a central round opening partly obstructing the passage between the carbureter and the manifold, said plate having a bridge member disposed centrally of the opening a hollow frusto-conical mixer having its widened and open end in contact with the bridge and having its reduced closed end apertured, a second hollow frusto-conical mixer arranged over the end of the first mentioned mixer, said last mentioned mixer having its outer reduced end apertured and its inner open end scalloped, a spacer washer between the first and second mentioned mixers, and an element passing through the mixers secured to the bridge of the plate for associating these elements.

In testimony whereof I affix my signature.

HENRY R. MICKA.